United States Patent
Majd et al.

(10) Patent No.: US 9,560,180 B2
(45) Date of Patent: Jan. 31, 2017

(54) SYSTEMS AND METHODS FOR ADJUSTING CARRIER QUALITY METRICS FOR INTRINSIC IMPAIRMENTS

(75) Inventors: Casem Majd, Holmdel, NJ (US); Stephen Vansaders, Manalapan, NJ (US); Gopala Rao, Homdel, NJ (US); Nirav J. Kadakia, Parlin, NJ (US); Andrew Bucko, Old Bridge, NJ (US)

(73) Assignee: Vonage Business Inc., Atlanta, GA (US)

(*) Notice: Subject to any disclaimer, the term of this patent is extended or adjusted under 35 U.S.C. 154(b) by 555 days.

(21) Appl. No.: 13/337,086

(22) Filed: Dec. 24, 2011

(65) Prior Publication Data

US 2013/0163730 A1 Jun. 27, 2013

(51) Int. Cl.
*H04M 1/24* (2006.01)
*H04M 3/22* (2006.01)
*H04L 29/06* (2006.01)

(52) U.S. Cl.
CPC ............. *H04M 1/24* (2013.01); *H04M 3/2227* (2013.01); *H04L 65/80* (2013.01); *H04M 2207/20* (2013.01)

(58) Field of Classification Search
USPC ...................... 379/9, 1.04, 265.06, 46, 88.09, 10.01,379/15.05, 16
See application file for complete search history.

(56) References Cited

U.S. PATENT DOCUMENTS

| | | | |
|---|---|---|---|
| 6,510,219 B1* | 1/2003 | Wellard et al. | 379/221.01 |
| 6,934,258 B1 | 8/2005 | Smith et al. | |
| 7,995,464 B1 | 8/2011 | Croak et al. | |
| 8,457,000 B2 | 6/2013 | West et al. | |
| 8,483,100 B2 | 7/2013 | Bennett et al. | |
| 2002/0131604 A1* | 9/2002 | Amine | 381/58 |
| 2007/0201485 A1* | 8/2007 | Rabipour | 370/395.21 |
| 2008/0002670 A1* | 1/2008 | Bugenhagen et al. | 370/352 |
| 2008/0063149 A1 | 3/2008 | West et al. | |

OTHER PUBLICATIONS

Office Action in corresponding U.S. Appl. No. 13/337,088 dated Aug. 28, 2013.
Notice of Allowance in corresponding U.S. Appl. No. 13/337,088 dated Apr. 3, 2014.

* cited by examiner

*Primary Examiner* — Yosef K Laekemariam
(74) *Attorney, Agent, or Firm* — Nixon & Vanderhye, P.C.; Joseph Pagnotta

(57) ABSTRACT

An Internet protocol (IP) telephony system terminates calls to certain groups of telephone numbers via multiple different telephony carriers. The IP telephony system will discontinue using a telephony carrier to terminate calls if the quality provided by the carrier falls below a threshold level. The IP telephony system includes a quality monitoring unit that determines when a particular group of telephone numbers are intrinsically impaired, such that no carrier could provide high quality when terminating calls to those numbers. In these circumstances, the IP telephony system adjusts the quality threshold to which a carrier's quality is compared when completing calls to the impaired numbers to account for the intrinsic impairment of the telephone numbers.

20 Claims, 7 Drawing Sheets

SYSTEMS AND METHODS FOR ADJUSTING CARRIER QUALITY METRICS FOR INTRINSIC IMPAIRMENTS

FIELD OF THE INVENTION

The invention is related to systems and methods for terminating telephony communications to called telephony devices. More specifically, the invention relates to systems and methods for fairly and accurately judging the quality provided by telephony carriers that terminate calls, even when those calls are directed to telephone numbers that are intrinsically impaired.

BACKGROUND OF THE INVENTION

Internet protocol (IP) telephony systems often complete calls to non-customers via one or more publically switched telephony networks (PSTNs), and via one or more cellular service providers. It is common for an IP telephony system to contract with multiple different telephony carriers, all of which are capable of terminating a call to the same telephone number. Thus, the IP telephony system often can choose which carrier it wishes to use to terminate a call.

Because an IP telephony system has choices, the IP telephony system monitors the quality provided by the different carriers it uses to terminate communications. If the quality provided by a particular carrier falls below a minimum acceptable level, the IP telephony system stops terminating calls through that carrier, and instead routes calls through an alternate carrier.

An IP telephony system also routes calls based on the price charged by the telephony carrier to terminate the calls. All other things being equal, the IP telephony system routes a call through the carrier that charges the least to terminate the call.

Some telephony carriers are quite large and are capable of terminating calls to many different telephone numbers. Because of their size and reach, it is common for an IP telephony system to route a large volume of calls through a large carrier.

Other carriers are quite small and are capable of terminating calls to only a small group of telephone numbers. Because of their smaller size and reach, it is common for the IP telephony system to route only a small volume of calls through a small carrier. However, often a small carrier is able to terminate calls for a lower cost than one of the large carriers. Thus, provided the small carrier can provide acceptable call quality, it is often desirable to route a call through a small carrier to obtain the lower termination rate.

Some telephone numbers, or groups of telephone numbers, are intrinsically impaired. This means that there is some problem that prevents any carrier, regardless of its size or capabilities, from terminating calls to those numbers and providing consistently high call quality.

If a small carrier is completing calls to numbers that are intrinsically impaired, the call quality metrics for those calls necessarily will be poor. And because the small carrier only handles a relatively small volume of calls, the poor call quality for calls to the intrinsically impaired telephone numbers will cause the average call quality values for the small carrier to appear relatively poor. Because of this, the IP telephony system will tend to stop routing calls through the small carrier.

Because the small carrier is no longer being used, calls to the intrinsically impaired numbers are instead routed to one of the large carriers. When a large carrier completes calls to the intrinsically impaired numbers, the quality of those calls will still be poor—because the telephone numbers are intrinsically impaired. But because the poor quality metrics for calls to the intrinsically impaired numbers will be averaged against a large volume of calls to numbers that are not intrinsically impaired, the overall average call quality metrics for the large carrier will still appear to be good. Thus, the IP telephony system will continue to terminate calls to the intrinsically impaired numbers through the large carrier.

As noted above, the large carrier could charge a higher rate to terminate calls than the small carrier. Because of the above factors, the IP telephony system could end up paying more to complete the calls to the intrinsically impaired telephone numbers through a large carrier than it would have paid to complete the calls through a small carrier, even through the quality of the calls is the same.

DETAILED DESCRIPTION OF PREFERRED EMBODIMENTS

The following description refers to terminating a telephony communication. This phrase refers to completing an incoming telephony communication, such as a voice or video telephone call, to a telephony device. This phrase also encompasses delivering text messages and other forms of text-based or video-based messaging to a telephony device. This phrase also encompasses other forms of communications that may be carried over a telephony network.

The term "call" or "telephone call" is used in the following description for ease of reference, clarity and brevity. However, all of the systems and methods described below which involve handling, routing and terminating calls would also apply to systems and methods of handling, routing and terminating other forms of telephony-based communications. Thus, the terms call and telephone call are intended to include other forms of telephony-based communications.

Figure 1:
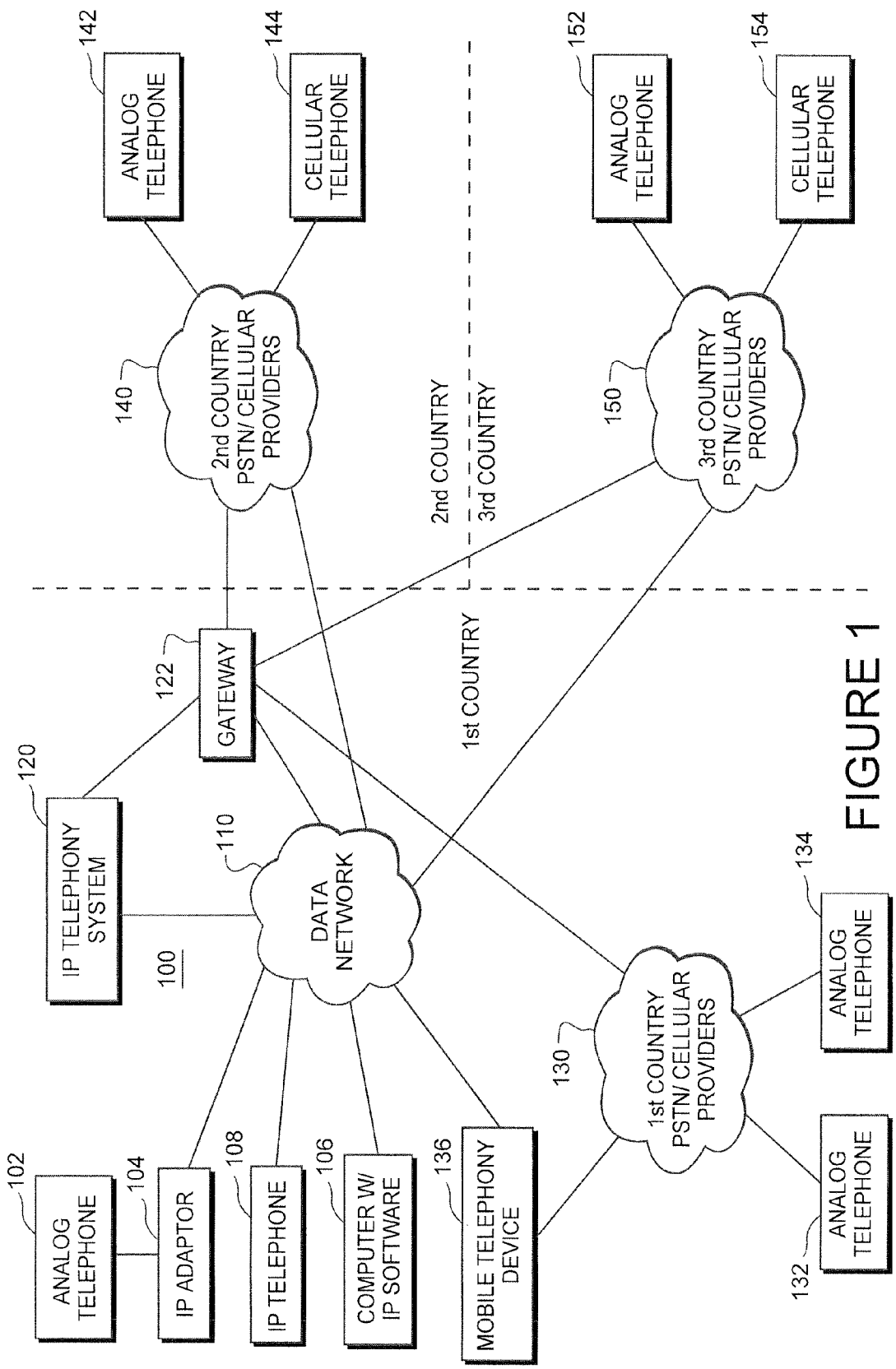
FIG. 1 is a system level representation of elements that interact with each other to terminate telephony communications to telephone numbers in different geographical regions.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. Also, although FIG. 1 illustrates the data network 110 as being located in a first country, the data network 110 may extend through multiple different countries. The IP telephony system 120 is connected to the data network 110. In addition, the IP telephony system 120 is connected to a first publicly switched telephone network (PSTN) 130 via a gateway 122. The PSTN 130 may also be directly coupled to the data network 110 through one of its own internal gateways (not shown). Thus, communications may pass back and forth between the IP telephony system 120 and the PSTN 130 through the data network 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the data network 110. Such an IP telephone 108 could be connected to an Internet service provider via a wired connection or via a wireless router. In some instances, the IP telephone 108 could utilize the data channel of a cellular telephone system to access the data network 110.

Alternatively, a customer could utilize an analog telephone 102 which is connected to the data network 110 via a telephone adapter 104. The telephone adapter 104 converts analog signals from the telephone 102 into data signals that pass over the data network 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone. In FIG. 1, mobile telephony device 136 is a telephony device capable of communicating over the data network 110, or over a cellular network 130.

In the example illustrated in FIG. 1, all of the elements described above are located in a first country. However, customers of the IP telephony system 120 can place calls to telephony devices in other countries, and receive calls placed from other countries. FIG. 1 illustrates that a second PSTN/cellular service provider 140 is located in a second country. The second PSTN/cellular service provider is capable of terminating calls to an analog telephone 142 and a cellular telephone 144 in the second country. The second PSTN/cellular service provider 140 is coupled to the gateway 122 and to the data network 110 so that calls originating from the IP telephony system 120 can be terminated to the analog telephone 142 and the cellular telephone 144 in the second country via the second PSTN/cellular service provider 144.

Similarly, a third PSTN/cellular service provider 150 located in a third country is also connected to the gateway 122 and the data network 110. This allows the IP telephony system 120 to terminate calls to the analog telephone 152 and the cellular telephone 154 in the third country through the third PSTN/cellular service provider 150 in the third country.

Figure 2:
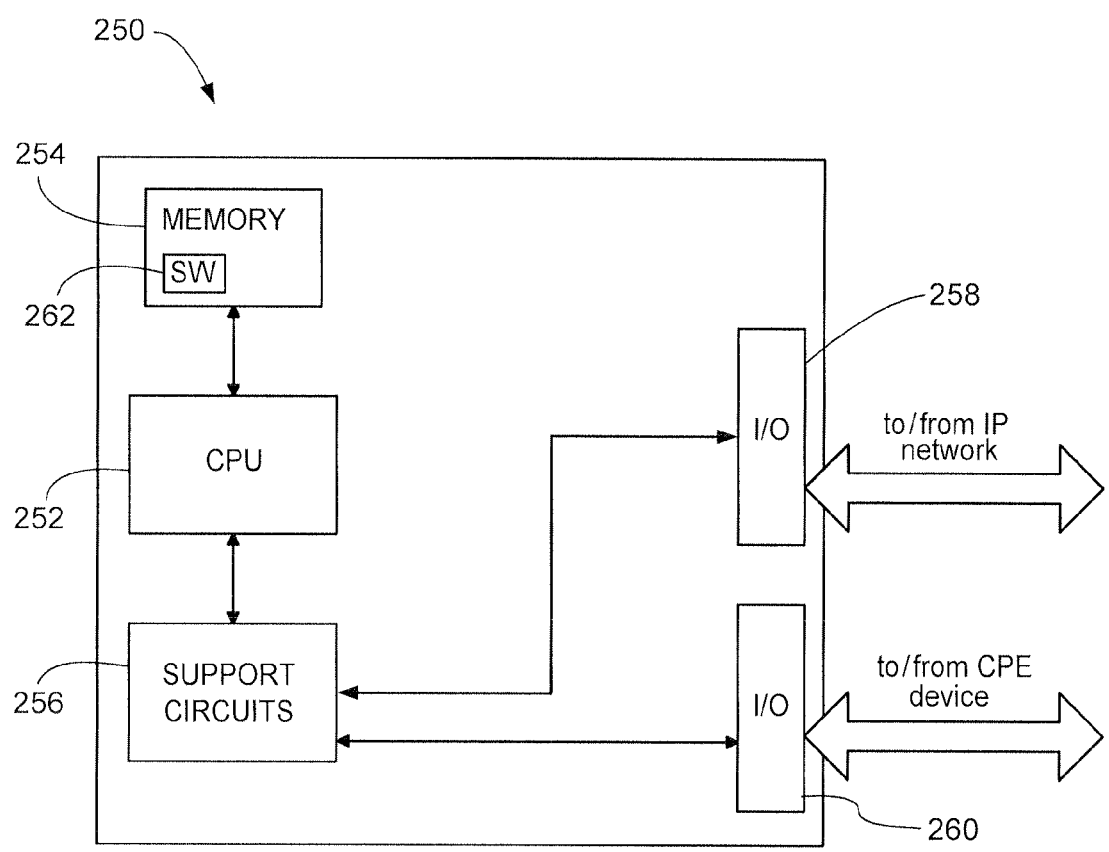
FIG. 2 is a block diagram of various elements of a processor that forms part of an IP telephony system operating in accordance with the invention.

FIG. 2 illustrates elements of a computer processor 250 that can be used as part of the system operated by the IP telephony system 120 to accomplish various functions. The IP telephony system 120 could utilize multiple processors 250 located at various locations, along with their operating components and programming, each carrying out a specific or dedicated portion of the functions performed by the IP telephony system 120.

The processor 250 shown in FIG. 2 may be one of any form of a general purpose computer processor used in operating an IP based communication system. The processor 250 comprises a central processing unit (CPU) 252, a memory 254, and support circuits 256 for the CPU 252. The processor 250 also includes provisions 258/260 for connecting the processor 250 to customer equipment via one or more access points, such as the packet network 110, the gateway 122 and a data channel provided by a cellular service provider, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

Another form of processor 250 that assists in execution and is otherwise part of the subject invention is found within one or more of the mobile telephony devices. Such devices are sufficiently advanced beyond early generation cellular telephones that they contain processors capable of running operating systems developed by device manufactures, as well as third party applications that are downloaded and installed by users to performing a myriad of communications and non-communications oriented tasks.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

The second PSTN/cellular service provider 140 illustrated in FIG. 1 would actually be made up of multiple different telephony carriers located in the second country. It is common for multiple carriers within a single geographical region, such as a country, to be capable of terminating calls to the same telephone numbers. A description of the different paths that a call might take between a calling party in a first country and a called party in a second country will now be provided with reference to FIG. 3.

Figure 3:
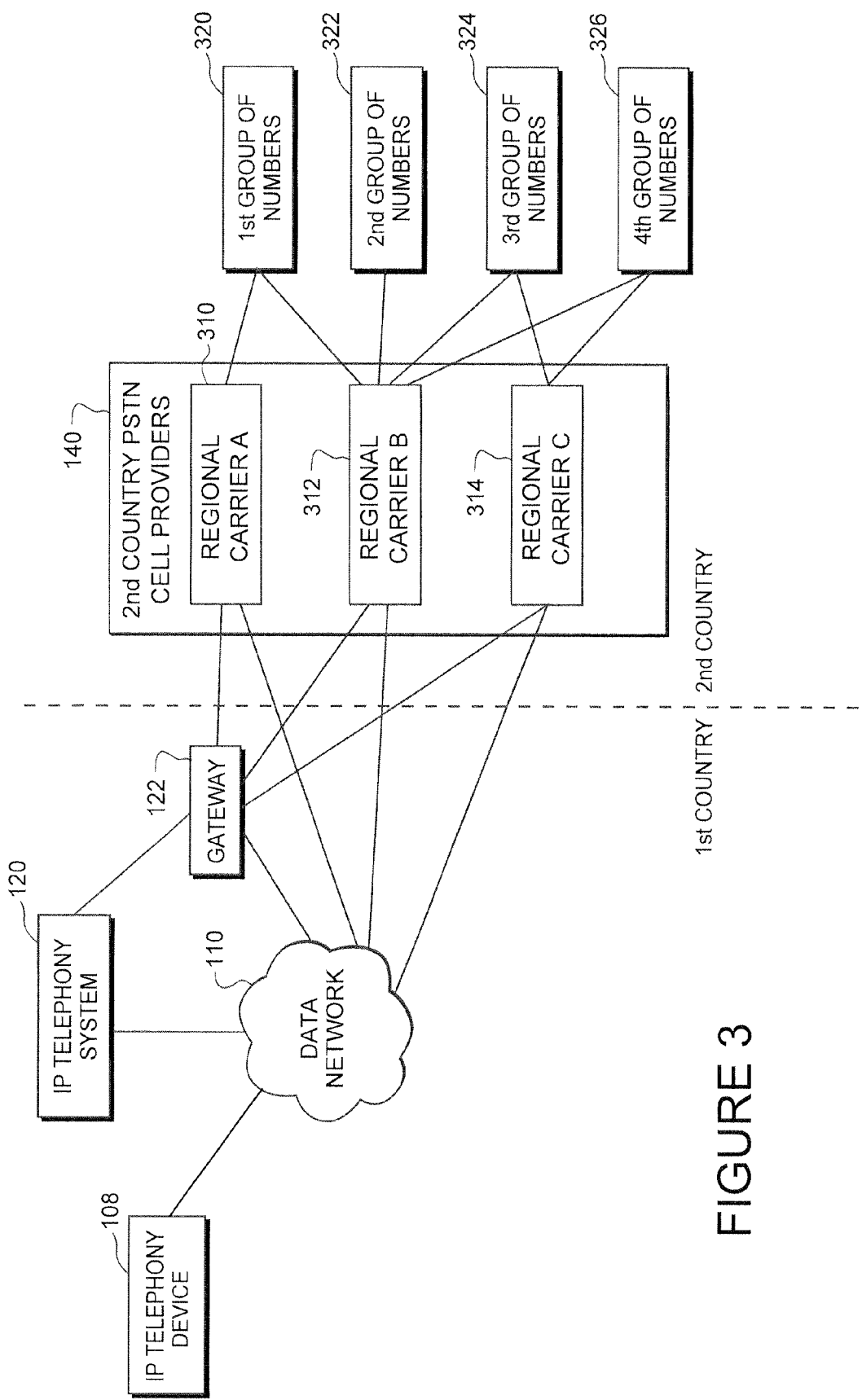
FIG. 3 is a first block diagram that illustrates various paths that a telephone call can take between a calling party and various different called telephone numbers.

As shown in FIG. 3, the PSTN/cellular service provider 140 located in the second country is comprised of regional carrier A 310, regional carrier B 312 and regional carrier C 314. The regional carriers terminate calls to different groups of telephone numbers located in the second country. As illustrated in FIG. 3, this includes a first group of telephone numbers 320, a second group of telephone numbers 322, a third group of telephone numbers 324 and a fourth group of telephone numbers 326.

Each group of telephone numbers is typically located within its own geographical region. However, some groups of telephone numbers may be assigned to mobile telephony devices that can be located in any location.

As illustrated in FIG. 3, regional carrier A 310 is only capable of terminating calls to the first group of telephone numbers 320. Regional carrier B 312, however, is capable of terminating calls to all four groups of telephone numbers. Regional carrier C is capable of terminating calls to the third group of telephone numbers 324 and the fourth group of telephone numbers 326. Regional carrier A would be considered a small carrier, and would likely carry a small volume of calls. Conversely, regional carrier B 312 would be considered a large regional carrier, and would likely carry a much larger volume of calls.

Figure 4:
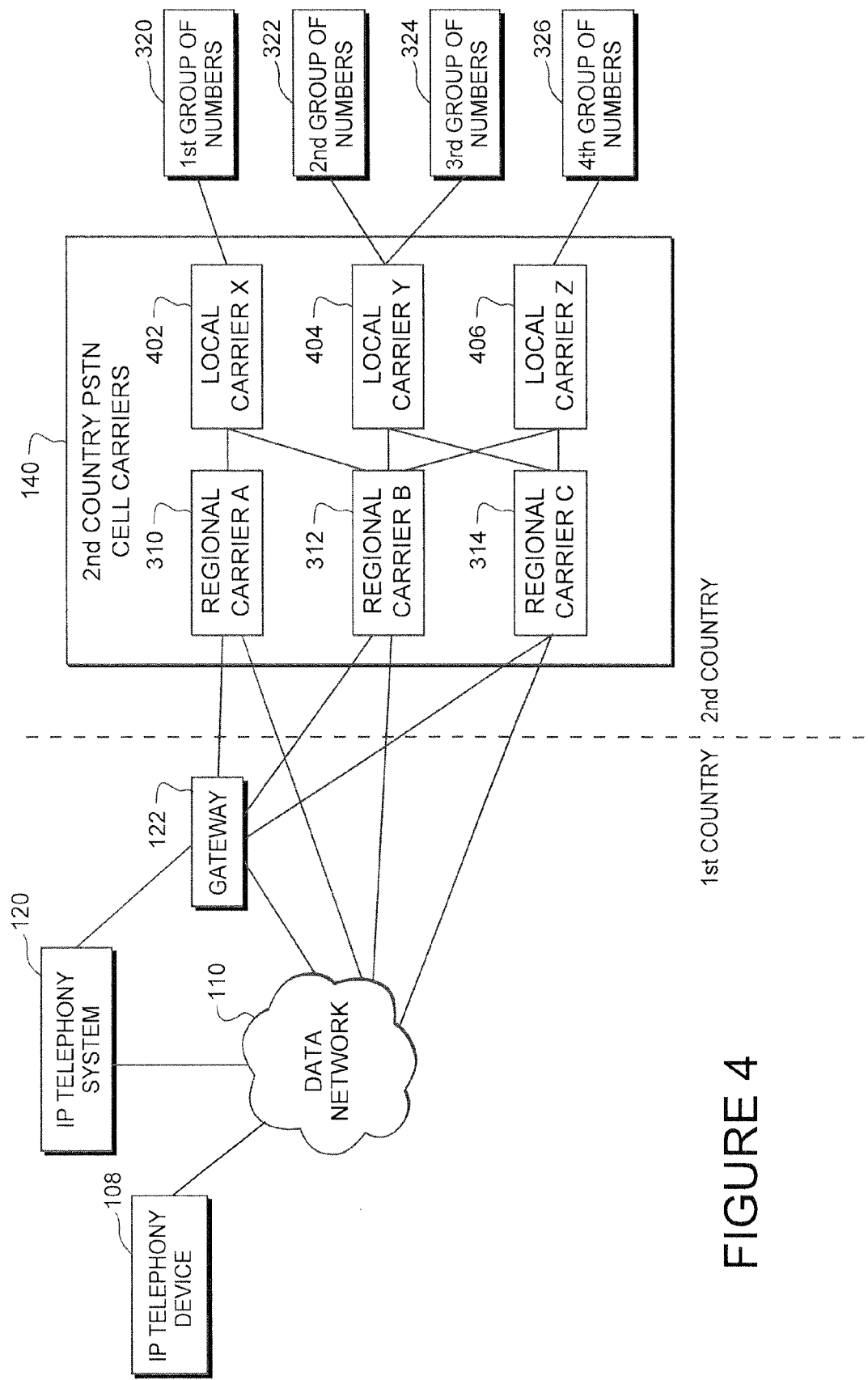
FIG. 4 is a second block diagram that illustrates various paths that a telephone call can take between a calling party and various different called telephone numbers.

FIG. 4 provides a more detailed depiction of how regional and local carriers may interact, in some circumstances, to terminate calls to groups of telephone numbers. As illustrated in FIG. 4, small local carriers may be responsible for terminating calls to small groups of telephone numbers. Thus, in FIG. 4, local carrier X 402 terminates all calls to the first group of numbers 320. Local carrier Y 404 terminates all calls to the second group of telephone numbers 322 and the third group of telephone numbers 324. Local carrier Z 406 terminates all calls to the fourth group of telephone numbers 326.

Regional carrier A terminates calls to the first group of telephone numbers 320 via local carrier X 402. Regional carrier B 312 uses all of the local carriers 402, 404 and 406 to terminate calls to all four groups of telephone numbers. Regional carrier C 314 uses local carrier Y 404 to terminate calls to the third group of telephone numbers 324 and local carrier Z 406 to terminate calls to the fourth group of telephone numbers 326.

For the sake of convenience, the IP telephony system 120 may not attempt to contract with every single one of the many different local carriers in order to be capable of terminating calls to all of the different telephone numbers located in the second country. Instead, the IP telephony system 120 may contract with a more limited numbers of regional carriers located in the second country. The regional carriers, in turn, maintain multiple contractual relationships with the multiple different local carriers so that the regional carriers can terminate calls to telephone numbers served by many different local carriers.

As explained above in the background section of the application, some groups of telephone numbers are simply intrinsically impaired, such that the average quality of calls placed to those numbers is consistently poor. This could be caused by many different factors.

For example, and with reference to FIG. 4, the first group of numbers 320 could be assigned to mobile telephones that are typically located in a remote part of the second country where there are few cell towers. As a result it will be common for the mobile telephones assigned to the first group of numbers 320 to be out of range of a cell tower, and thus unavailable to receive an incoming call. Likewise, the mobile telephones may frequently be near to the edge of a coverage zone, resulting in poor quality when a call is actually connected. Thus, the first group of telephone numbers 320 would be considered intrinsically impaired.

The first group of telephone numbers 320 is served by local carrier X 402. If local carrier X 402 simply provides poor service, then the average quality of calls to the first group of telephone numbers 320 will be poor, simply because the calls must pass through local carrier X 402.

Thus, here again, the first group of telephone numbers 320 would be considered intrinsically impaired.

When the first group of telephone numbers 320 is intrinsically impaired, it will not matter whether the IP telephony service 120 routes calls to the first group of telephone numbers 320 via regional carrier A 310 or regional carrier B 312. In both instances, the call quality is likely to be poor because the first group of telephone numbers is simply intrinsically impaired.

The IP telephony system 120 monitors the quality of the telephone calls terminated through regional carriers. Typically, the IP telephony system calculates average call quality statistics for each carrier that are based on averages of call quality measures recorded for multiple different telephone calls. So long as the average call quality provided by a regional carrier remains good, the IP telephony system 120 continues to use the regional carrier to terminate calls. However, if a carrier's average quality measures fall below a threshold level, the IP telephony system 120 stops terminating calls through the regional carrier.

In the example illustrated in FIG. 4, the IP telephony system 120 can terminate calls to telephone numbers in the first group 320 via regional carrier A 310 or regional carrier B 312. Because the first group of telephone numbers 320 is intrinsically impaired, we expect that calls completed through regional carrier A 310 to the first group of telephone numbers 320 will be relatively poor. And because the IP telephony system 120 only uses regional carrier A 310 to complete calls to the first group of telephone numbers 320, the overall average call quality values for regional carrier A 310 will be correspondingly poor. And this would otherwise cause the IP telephony system to stop routing calls through regional carrier A 310.

In contrast, the IP telephony system 120 uses regional carrier B 312 to complete telephone calls to all four of the groups of telephone numbers 320, 322, 324, 326. Even though the quality of calls to the intrinsically impaired first group of telephone numbers 320 will be poor, the quality of those calls will be averaged against the quality of calls that are terminated to the second, third and fourth groups of telephone numbers. As a result, the average call quality provided by regional carrier B 312 will remain relatively high. For this reason, the IP telephony system 120 will continue to route calls to the first group of telephone numbers 320 via regional carrier B 312, despite the fact that the quality of the calls routed through regional carrier B 312 is not better than the quality of the calls routed through regional carrier A.

Another problem that can arise relates to route oscillations. If multiple carriers terminate calls to an impaired group of telephone numbers, the IP telephony system 120 may use a first carrier until it determines that the call quality provided by the first carrier is poor. Once this is determined, the IP telephony system 120 instead begins terminating calls through a second carrier. Because the telephone numbers are intrinsically impaired, the quality provided by the second carrier will be no better. Once the IP telephony system 120 determines that the call quality provided by the second carrier is also poor, the IP telephony system may switch back to the first carrier, or it may begin terminating calls through a third carrier. None of these switches between carriers will improve call quality. And the route oscillations themselves can cause instability and rate increases.

In instances where regional carrier A 310 is willing to terminate calls to the first group of telephone numbers 320 for a lower cost than regional carrier B 312, this system produces the perverse result that the IP telephony system 120 selects and uses the higher cost route, even though it does not result in high quality calls. Because of this situation, it is desirable to be able to identify intrinsically impaired groups of telephone numbers, and to take this intrinsic impairment into account when judging the quality provided by carriers, and when determining how to route calls through the carriers.

Figure 5:
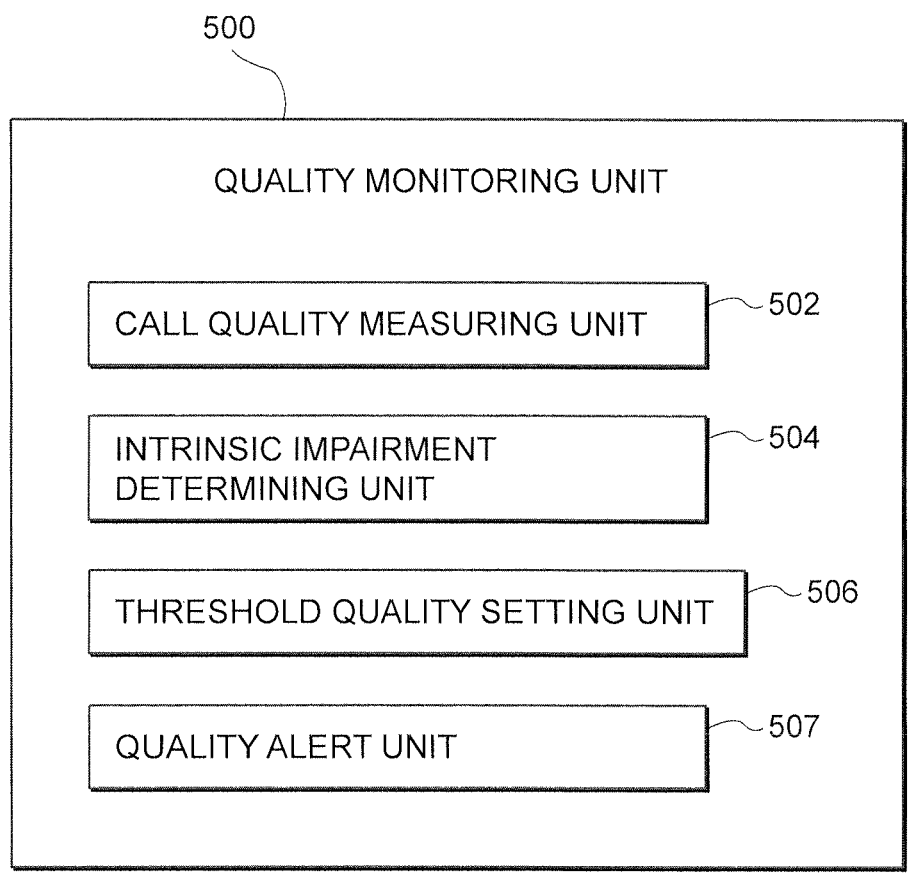
FIG. 5 is a block diagram illustrating elements of a quality monitoring unit of an IP telephony system embodying the invention.

FIG. 5 illustrates a quality monitoring unit 500 embodying the invention that is part of the IP telephony system 120. The quality monitoring unit 500 includes a call quality measuring unit 502 that measures the quality of calls terminated through regional telephony carriers. In some embodiments, the quality measuring unit 502 measures data packet transmission statistics such as latency, delay, packet loss, jitter and other packet delivery measures. In some embodiments, the call quality measuring unit 502 calculates various call quality measures such as the Answer Seizure Ratio (ASR), call blocking, or the Average Call Duration (ACD). In some embodiments, the quality measuring unit 502 conducts evaluations of the audio quality of calls based on any one of multiple different techniques, as are well known to those skilled in the art. The call quality measuring unit 502 applies statistical analyses to the quality measures that have been obtained for multiple calls placed to a particular group of telephone numbers via a specific carrier to arrive at a quality measure for that carrier for calls directed to that group of telephone numbers.

The call quality measures could include latency, delay, packet loss, jitter, one-way audio, call blocking, Answer to Bid Ratio (ABR), Answer to Seizure Ratio (ASR), as well as other measures.

The quality monitoring unit 500 also includes an intrinsic impairment determining unit 504. The intrinsic impairment determining unit 504 identifies groups of telephone numbers that are intrinsically impaired. The intrinsic impairment determining unit 504 may also determine a degree of impairment for a particular group of telephone numbers. The methods used to determine when a group of telephone numbers is impaired are described in detail below.

Once a particular group of telephone numbers has been identified as intrinsically impaired, the quality of calls to those numbers is no longer judged by the same standards that would be applied to calls to telephone numbers that are not intrinsically impaired. Instead, a threshold quality setting unit 506 of the quality monitoring unit 500 develops a quality threshold that should be applied to calls to the intrinsically impaired numbers. When a carrier is judged based on the quality it provides for the calls it terminates, the carrier is judged based on this different threshold for calls placed to the intrinsically impaired numbers.

The quality monitoring unit 500 also includes a quality alert unit 508 that monitors the quality being provided by the various carriers the IP telephony system 120 is using to terminate calls. If a particular carrier is not providing a sufficiently high quality, the quality alert unit 507 issues an alert to system operators.

Figure 6:
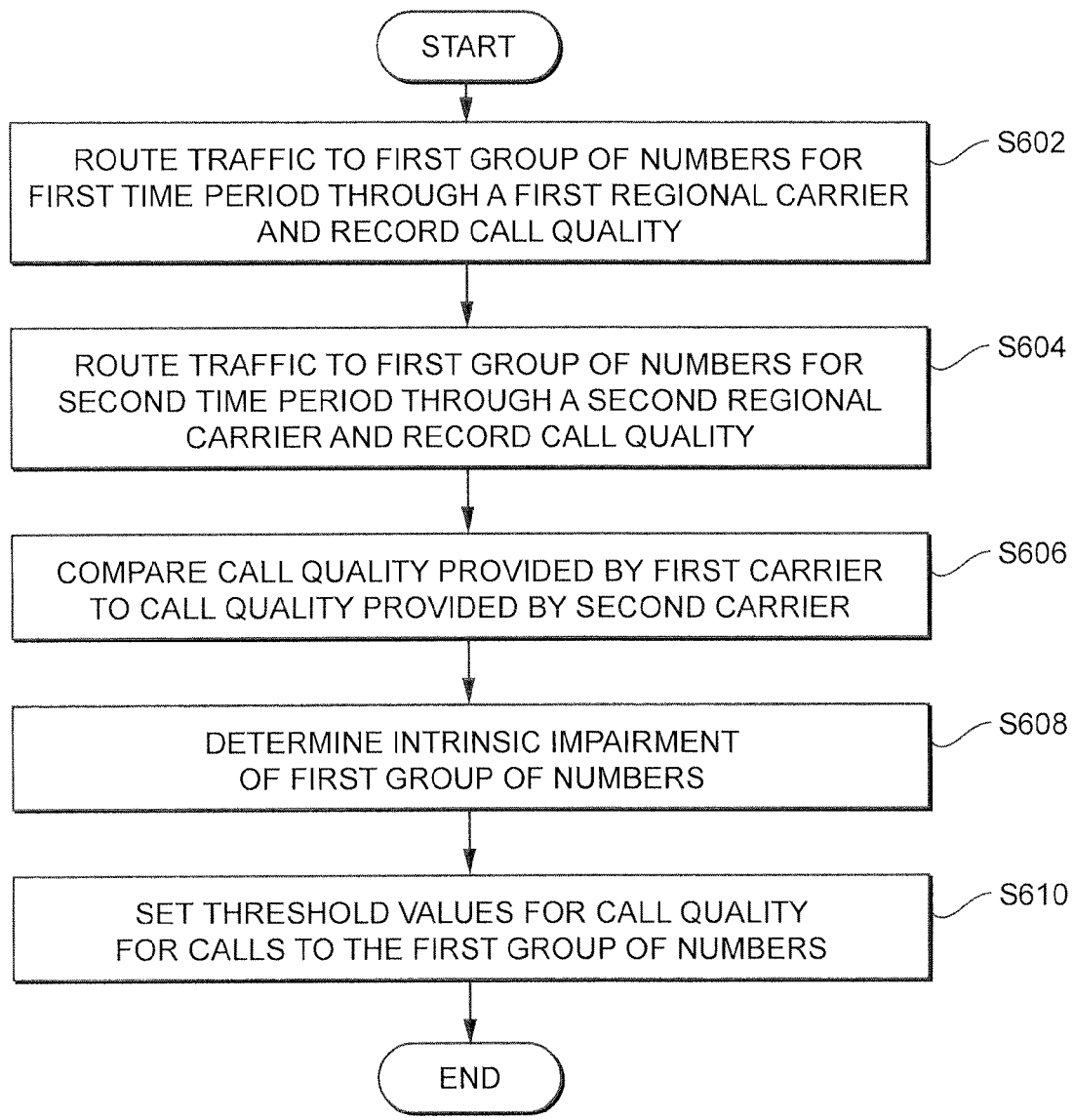
FIG. 6 is a diagram illustrating steps of a method embodying the invention for determining a degree of intrinsic impairment of a group of telephone numbers.

FIG. 6 illustrates steps of a method embodying in the invention for identifying an intrinsically impaired group of telephone numbers. The method beings in step S602 when the intrinsic impairment determining unit 504 of a quality monitoring unit 500 causes calls to be terminated to a group of telephone numbers via a first regional carrier for a first time period. During this time period, the call quality measuring unit 502 monitors and records the quality provided by the first carrier for those calls.

Next, in step S604, the intrinsic impairment determining unit causes calls to be terminated to the same group of telephone numbers through a second carrier for a second period of time. During this time period, the call quality measuring unit 502 also monitors and records the call quality provided by the second carrier for those calls.

In some embodiments of the invention, the duration of the first time period is approximately equal to the duration of the second time period. Also, in some embodiments the first time period includes the same days of the week as the second time period. These factors can help to ensure that the quality measures calculated for the first and second carriers over the first and second time periods can be used to fairly compare the relative performance of the first and second carriers.

In step S606, the quality provided by the first carrier for calls to the group of telephone numbers over the first time is compared to the quality provided by the second carrier over the second time period. In most instances, one of the carriers will provide better quality than the other. The quality provided by the carrier providing the best quality is assumed to be the best that any carrier could provide. Thus, the quality provided by the best carrier is used to establish a baseline of expected quality for calls to the group of telephone numbers. As the volume of historical data grows, the degree of impairment of the group of telephone numbers can be determined with greater specificity.

In some embodiments, the step of routing traffic to the group of telephone numbers would be repeated for additional carriers. For example, steps similar to steps S602 and S604 could be performed for third, fourth and additional carriers. The greater the number of carriers that are used, and the longer the time period during which impairment data is collected, the better the chance of obtaining an accurate measure of the baseline quality that should be expected for calls to the group of telephone numbers.

The actual quality measures, and the statistical analyses that are performed on the collected call quality data can vary. Regardless, systems and methods embodying the invention make it possible to identify intrinsically impaired numbers, and the degree of impairment.

In step S608, the intrinsic impairment determining unit 504 determines whether the group of telephone numbers being tested is intrinsically impaired. If the quality provided by the best carrier during the testing steps is similar to the quality that is generally provided for calls to non-impaired telephone numbers, the group is determined to not be intrinsically impaired. However, if the quality provided by the best of the carriers is still significantly lower than the quality one expects for non-impaired numbers, the group of telephone numbers is determined to be intrinsically impaired.

If a group of numbers is determined to be intrinsically impaired, then the intrinsic impairment determining unit 504 may also determine a degree of impairment. The quality offered by the best of the carriers during the testing steps is used to establish the degree of impairment. In some embodiments, the intrinsic impairment determining unit 504 establishes different levels of impairment, and then groups the tested group of telephone numbers into one of those levels based on the quality offered by the best of the carriers during the testing steps.

As noted above, the quality alert unit 507 compares the quality being provided by a carrier for calls to a particular group of numbers to a threshold value. If the quality provided by the carrier is below the threshold, the quality alert unit 507 issues a warning.

The threshold to which a carrier's quality is compared can vary from one group of telephone numbers to the next. If the testing performed during a method as illustrated in FIG. 6 indicates that a group of numbers is severely intrinsically impaired, then the threshold for acceptable quality for calls to those numbers will be set very low. Conversely, if a group of numbers is only slightly intrinsically impaired, the threshold quality level is set higher.

In some embodiments, the method proceeds to step S610, wherein the threshold quality setting unit 506 of the quality monitoring unit 500 sets one or more threshold quality values for the group of telephone numbers being tested. The threshold values would be based on the quality that was provided by the best of the carriers that were tested. If even the best of the carriers still provided a relatively low level of quality for calls to the group of numbers, then the threshold values would be set quite low. As mentioned, the threshold values would then be used by the quality alert unit 507 to determine if a particular carrier is providing acceptable quality for calls to the group of telephone numbers.

A method as illustrated in FIG. 6, and as described above, could be performed on a periodic basis for each group of telephone numbers to which an IP telephony system 120 terminates calls. As a result, the impairment of a group of numbers, the degree of intrinsic impairment, and the threshold quality values for the group of numbers may change over time.

Figure 7:
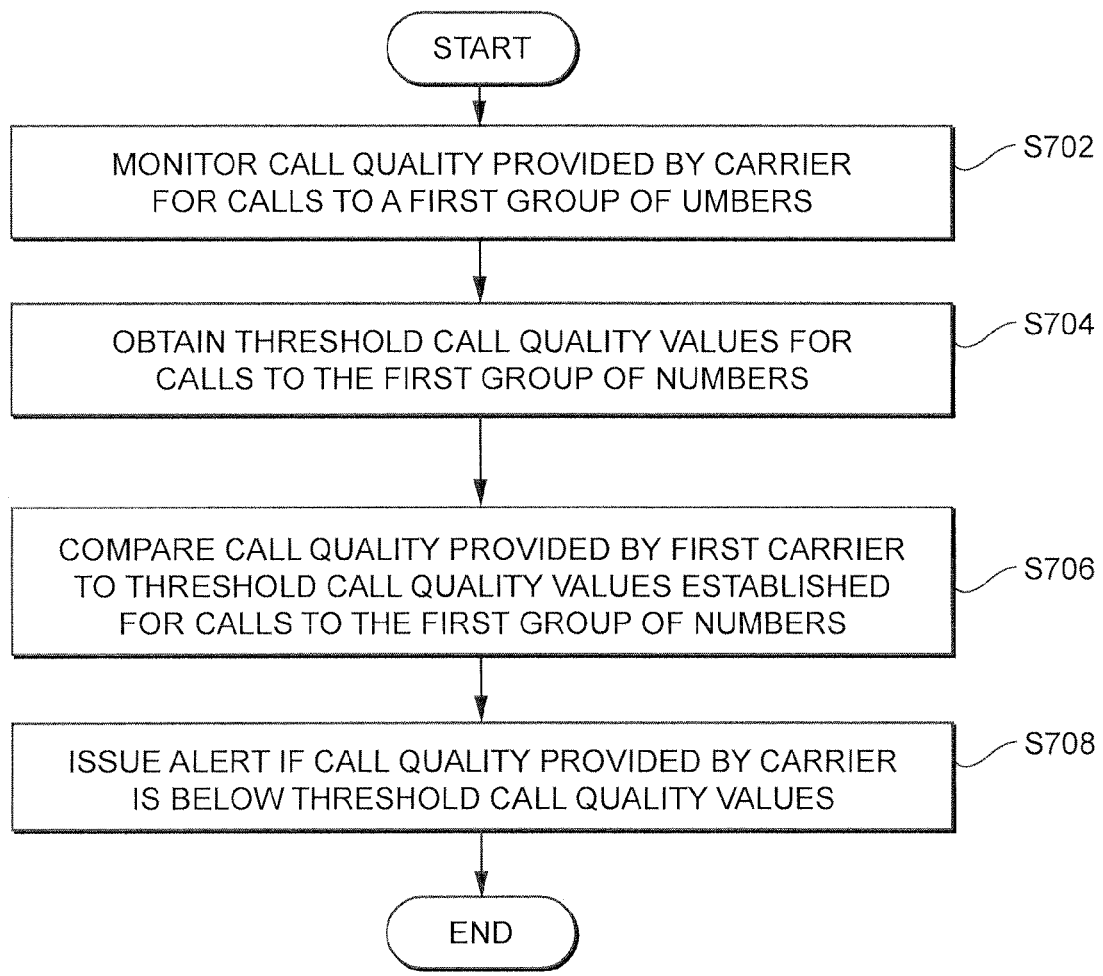
FIG. 7 is a diagram illustrating steps of a method embodying the invention for providing an alert if the quality provided by a telephony carrier falls below a minimum acceptable level.

FIG. 7 illustrates steps of a method of determining whether to issue an alert for a carrier. The method begins in step S702 when the call quality measuring unit 502 monitors the quality being provided by a carrier for calls to a particular group of telephone numbers. In step S704, the quality alert unit 507 obtains the threshold quality value or values for that group of telephone numbers. In step S706, the measured quality provided by the carrier is compared to the threshold value or values. Then, in step S708 the quality alert unit 507 issues an alert if the call quality provided by the carrier is lower than the established threshold value or values.

Although some of the foregoing examples describe calls being terminated between a caller in a first country and a called party in a second country, systems and methods embodying the invention can also terminate calls between parties located within a single country.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:
1. A method of determining a degree of intrinsic quality impairment of a group of telephone numbers, comprising:
   determining a quality of telephone calls that are placed to the group of telephone numbers via a first telephony carrier for a first period of time;

determining a quality of telephone calls that are placed to the group of telephone numbers via a second telephony carrier for a second period of time; and determining a degree of intrinsic quality impairment of the group of telephone numbers based on the determined quality of the telephone calls placed via the first and second telephony carriers.

2. The method of claim 1, wherein the degree of intrinsic quality impairment of the group of telephone numbers is based on the determined quality of the telephone calls that was provided by the telephony carrier providing the best quality.

3. The method of claim 1, wherein the step of determining a degree of intrinsic quality impairment comprises:

determining which of the carriers provided the best quality; and using the quality provided by the carrier providing the best quality to determine the degree of intrinsic quality impairment of the group of telephone numbers.

4. The method of claim 1, wherein the step of determining a degree of intrinsic quality impairment comprises:

conducting a statistical analysis of call quality data to determine the highest call quality that was provided by the first and second carriers for calls placed to the group of telephone numbers over the first and second periods of time; and determining the degree of intrinsic quality impairment based on the determined highest call quality.

5. The method of claim 1, wherein the step of determining the quality of telephone calls placed to the group of telephone numbers via the first telephony carrier comprises measuring a quality of multiple telephone calls placed to the group of telephone numbers via the first telephony carrier over the first period of time and conducting a statistical analysis of the measured quality of those calls.

6. The method of claim 1, further comprising determining a quality of telephone calls that are placed to the group of telephone numbers via a third telephony carrier for a third period of time, and wherein the step of determining a degree of intrinsic quality impairment of the group of telephone numbers is also based on the determined quality of the telephone calls placed via the third carrier.

7. The method of claim 1, wherein the duration of the first period of time is approximately equal to the duration of the second period of time.

8. The method of claim 1, wherein the first and second periods of time cover the same days of the week and have approximately the same duration.

9. The method of claim 1, further comprising setting a threshold quality value for calls placed to the group of telephone numbers based on the determined intrinsic quality impairment of the group of telephone numbers.

10. The method of claim 1, wherein all of the telephone numbers in the group of telephone numbers are associated with telephony devices located within a single geographical region.

11. A system for determining a degree of intrinsic quality impairment of a group of telephone numbers, comprising:

means for determining a quality of telephone calls that are placed to the group of telephone numbers via a first telephony carrier for a first period of time;

means for determining a quality of telephone calls that are placed to the group of telephone numbers via a second telephony carrier for a second period of time; and means for determining a degree of intrinsic quality impairment of the group of telephone numbers based on the determined quality of the telephone calls placed via the first and second telephony carriers.

12. A system for determining a degree of intrinsic quality impairment of a group of telephone numbers, comprising:

a call quality measuring unit that determines a quality of telephone calls that are placed to the group of telephone numbers via a first telephony carrier for a first period of time and that determines a quality of telephone calls that are placed to the group of telephone numbers via a second telephony carrier for a second period of time; and an intrinsic impairment determining unit that determines a degree of intrinsic quality impairment of the group of telephone numbers based on the determined quality of the telephone calls placed via the first and second telephony carriers.

13. The system of claim 12, wherein the intrinsic impairment determining unit determines the degree of intrinsic quality impairment of the group of telephone numbers is based on the determined quality of the telephone calls that was provided by the telephony carrier providing the best quality.

14. The system of claim 12, wherein the intrinsic impairment determining unit determines the degree of intrinsic quality impairment by determining which of the carriers provided the best quality, and using the quality provided by the carrier providing the best quality to determine the degree of intrinsic quality impairment of the group of telephone numbers.

15. The system of claim 12, wherein the intrinsic impairment determining unit determines the degree of intrinsic quality impairment by conducting a statistical analysis of call quality data to determine the highest call quality that was provided by the first and second carriers for calls placed to the group of telephone numbers over the first and second periods of time, and determines the degree of intrinsic quality impairment based on the determined highest call quality.

16. The system of claim 12, wherein the call quality measuring unit determines the quality of telephone calls placed to the group of telephone numbers via the first telephony carrier by measuring a quality of multiple telephone calls placed to the group of telephone numbers via the first telephony carrier over the first period of time and conducting a statistical analysis of the measured quality of those calls.

17. The system of claim 12, wherein the call quality measuring unit is also configured to determine a quality of telephone calls that are placed to the group of telephone numbers via a third telephony carrier for a third period of time, and wherein the step of intrinsic impairment determining unit determines the degree of intrinsic quality impairment of the group of telephone numbers based on the determined quality of the telephone calls placed via the third carrier.

18. The system of claim 12, wherein the call quality measuring unit determines a quality of telephone calls that are placed to the group of telephone numbers via the first and second carriers using data gathered over first and second time periods having approximately equal duration.

19. The system of claim 12, wherein the call quality measuring unit determines a quality of telephone calls that are placed to the group of telephone numbers via the first and second carriers using data gathered over first and second time periods that include the same days of the week and that have approximately equal duration.

20. The system of claim 12, further comprising a threshold quality setting unit that sets a threshold quality value for calls placed to the group of telephone numbers based on the determined intrinsic quality impairment of the group of telephone numbers.

\* \* \* \* \*